Sept. 20, 1932.　　　F. D. LINGWOOD　　　1,878,500
HAND OPERATED SHEARING TOOL
Filed Dec. 28, 1931
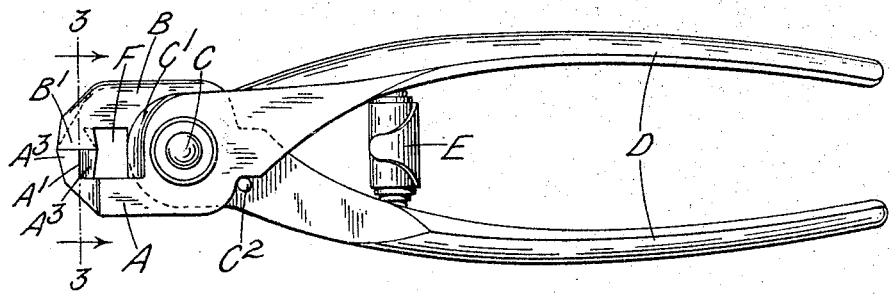
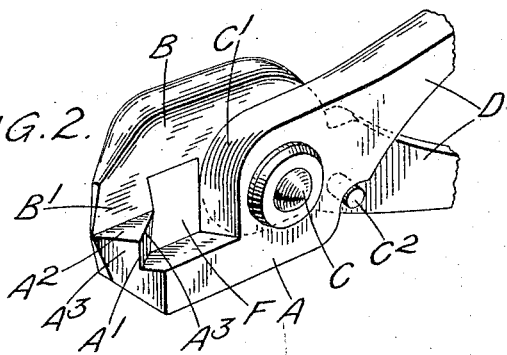
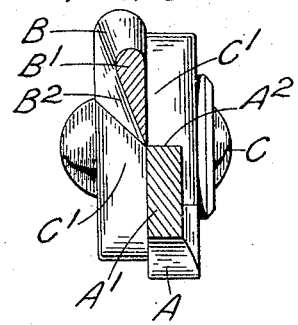
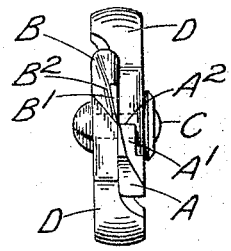
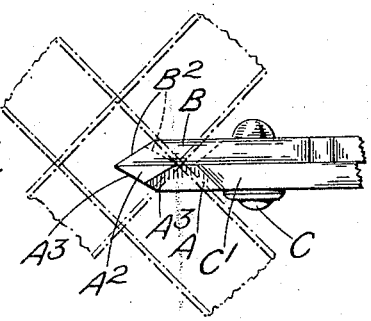
Inventor,
F. D. LINGWOOD.
Per,
Blair-Kilcoyne Atty.

Patented Sept. 20, 1932

1,878,500

UNITED STATES PATENT OFFICE

FREDERICK DONALD LINGWOOD, OF LONDON, ENGLAND, ASSIGNOR TO MANUFAX LIMITED, OF LONDON, ENGLAND, A COMPANY OF GREAT BRITAIN

HAND-OPERATED SHEARING TOOL

Application filed December 28, 1931, Serial No. 583,550, and in Great Britain June 2, 1931.

This invention relates to hand-operated shearing tools and has for its object to provide an improved shearing tool which will be capable of severing miniature girders and like members formed, for example, of laminated sheet or strip metal.

A hand-operated shearing tool according to the present invention, more particularly for severing miniature girders formed of laminated sheet or strip metal, comprises two pivoted jaws the cooperating shearing portions of which are formed at the outer ends of the jaws while parts of the jaws between the shearing portions and the pivot connecting the jaws are cut away to provide a gap between the jaws which will accommodate the flange of a girder, the shearing portion of one jaw of the tool being formed with a flat face of appreciable area acting as an anvil to support the part of the girder to be sheared and one edge of the anvil face co-acting in the shearing operation with a part of the other jaw which is formed as a knife edge. Preferably the front of the anvil part which cooperates with the said knife edge is formed flat with a straight cutting edge, while the back of the anvil part is so formed either curved or bevelled as to provide clearance which will permit of cutting through girder or like members at a substantial angle to the length of such members without the anvil part fouling the girder flanges or other parts which may lie in planes at right angles to that of the part actually being sheared at any moment.

In a convenient arrangement the back of the anvil part is cut away or oppositely bevelled off so as to give to this part an approximately triangular cross-section in planes parallel to the anvil face on which the metal to be sheared rests.

The back of the knife edge portion of the cutting jaw, i. e. the part lying remote from the front face of this jaw which cooperates with the front of the anvil, is conveniently also similarly formed curved or oppositely bevelled off so that this knife edge part, while it will permit girders or like members to be cut through at a substantial angle to the length of such members in the manner referred to above, is also of robust construction. Further, a stop is preferably provided to limit the movement of the jaws towards one another after the shearing operation is completed, thus tending to prevent distortion of the metal sheared due to the knife edge jaw being forced to an unnecessary extent through the slot cut during shearing.

The invention may be carried into practice in various ways but one construction of tool according to this invention is illustrated by way of example in the accompanying drawing, in which Figure 1 is a side elevation of the complete tool, Figure 2 is a perspective view of the jaws of the tool shown in Figure 1, Figure 3 is a section on the line 3—3 of Figure 1, Figure 4 is an end view of the tool shown in Figure 1, and Figure 5 is a plan of the jaws of the tool shown in Figure 1 indicating how the tool can be used to sever a girder diagonally.

In the construction illustrated the tool comprises an anvil jaw A and a cutting jaw B pivoted together at C and provided with handles D between which lies a spring E tending to separate these handles. As shown the ends of the jaws A and B remote from the pivot constitute the actual shearing portions, the jaws being cut away as shown at F between their end portions and the pivot so as to provide a space or gap in which can lie the flange of a girder while its web is being severed.

The end part $A^1$ of the anvil jaw A is formed as shown with a flat upper surface $A^2$ constituting an anvil on which can rest the web of a girder to be severed, while the end $B^1$ of the cutting jaw B is formed as a knife edge which co-acts during the shearing operation with the front edge of the anvil. The back of the anvil part $A^1$ of the jaw A, i. e. the part remote from the cutting edge, is cut away or oppositely bevelled off as shown at $A^3$ so that the part $A^1$ is of triangular cross-section in planes parallel to the anvil face $A^2$ as shown in Figure 2. Similarly the back of the part $B^1$ of the jaw B is oppositely bevelled off as shown at B² in Figure 5, while the part C¹ of each jaw forming the end of the recess adjacent the pivot C is bevelled or rounded as shown.

In cutting a miniature girder the part of the girder which is to be used is placed on the face A² of the anvil part A and, by reason of the area of the face A² of this jaw, this part of the girder during the shearing operation will tend not to be bent or distorted but will be cut off cleanly. Further, owing to the triangular cross-section of the part A¹ and the manner in which the jaw B is bevelled off at B² as well as the dimensions of the recess F and the bevelling of the part C¹, a miniature girder can be inserted between the jaws and its web cut diagonally completely across and right up to its flanges either in a direction at right angles to the length of the girder or diagonally at any angle up to approximately 25° to the longitudinal axis of the girder without any part of the tool fouling the girder flanges. The manner in which this construction and arrangement of the parts makes it possible to sever diagonally the webs of miniature girders is indicated in Figure 5.

A stop C² is conveniently provided to limit the amount which the shearing portions A¹ and B¹ of the jaws can overlap when the shearing operation is completed, thus preventing distortion of the girder after cutting due to the cutting jaw B B¹ being forced to any considerable extent through the slot cut.

It is to be understood that the construction illustrated is given by way of example only and that constructional details may be modified without departing from this invention.

What I claim as my invention and desire to secure by Letters Patent is:—

1. A hand-operated shearing tool for severing miniature girders including in combination two jaws, a pivotal joint connecting one end of one jaw to one end of the other jaw, the jaws being oppositely recessed between the pivotal joint and their free ends to provide a gap which will accommodate a flange of a girder whose web is being severed, a knife edge on the outer end of one of the jaws forming a first shearing portion, a second shearing portion on the outer end of the other jaw having a plane face constituting an anvil for supporting the part of the girder to be sheared and having a straight edge with which the first shearing portion co-operates, the second shearing portion being tapered towards the gap formed by the recesses in the jaws so as to allow the girder flange to lie in this gap without fouling the shearing portions during shearing of the web at angles other than at right angles to the length of the girder.

2. A hand-operated shearing tool for severing miniature girders, including in combination two jaws, a pivot connecting one end of one jaw to one end of the other jaw, the jaws being oppositely recessed between said pivot and their free ends to provide a gap which will accommodate a flange of a girder whose web is being severed, a knife edge on the free end of one of said jaws and forming a first shearing portion, a wedge-shaped anvil part at the free end of the other jaw constituting the other shearing portion and having a substantially triangular plane face for supporting the part of the girder to be sheared, one edge of the triangular face cooperating with the first shearing member to shear the girder web, while an apex of the wedge-like anvil part is directed towards the gap formed by the recesses in the jaws so that a girder flange can lie in this gap without fouling the shearing portions during the shearing of the web at angles inclined to the length of the girder.

3. A hand-operated shearing tool for severing miniature girders including in combination two jaws, a pivotal joint connecting one end of one jaw to one end of the other jaw, the jaws being oppositely recessed between the pivotal joint and their free ends to accommodate between them a flange of a girder whose web is being severed, upper and lower block-like shearing members respectively on the free ends of the jaws each having a vertical face lying substantially in the plane of shear, the upper face of the lower block lying at right angles to its vertical face and constituting an anvil for supporting the part of the girder to be sheared, while the lower face of the upper block is inclined at an angle to its vertical face to form therewith a knife edge, both blocks being tapered towards said pivot joint to allow said girder flange to be accommodated at a substantial angle to the axis of the tool.

4. A hand-operated shearing tool for severing miniature girders including in combination two jaws, a pivotal joint connecting one end of one jaw to one end of the other jaw, the jaws being oppositely recessed between the pivotal joint and their outer ends so as to provide a gap which will accommodate a flange of a girder whose web is being severed, cooperating shearing portions on the outer ends of the jaws one of which is formed with a flat face acting as an anvil for supporting the part of the girder to be sheared while the other is tapered to provide a knife-like shearing edge, and a stop for determining the maximum extent to which the cooperating shearing portions can overlap.

5. A hand-operated shearing tool for severing miniature girders including in combination two jaws, a pivotal joint connecting one end of one jaw to one end of the other jaw, the jaws being oppositely recessed between said pivotal joint and their outer ends to provide a gap which will accommodate a flange of the girder whose web is being severed, cooperating shearing portions on the outer ends of the jaws one of which is formed with a flat face acting as an anvil for supporting the end of the girder to be sheared, while the other is tapered to provide a knife-like shearing edge each shearing member being tapered both towards its end nearer to and towards its end remote from the gap formed by the recesses in the jaws so as to permit the tool to sever the web of a girder at a substantial angle to the length of such girder without the shearing portions fouling either of the flanges of the girder.

6. A hand-operated shearing tool for severing miniature girders including in combination two jaws, a pivotal joint connecting one end of one jaw to one end of the other jaw, the jaws being oppositely recessed between the pivotal joint and their outer ends to provide a gap which will accommodate a flange of a girder whose web is being severed, coacting shearing portions on the outer ends of the jaws one of which is formed with a flat face acting as an anvil for supporting the part of the girder to be sheared, while the other is tapered to provide a knife-like shearing edge, each shearing portion being tapered both towards its end nearer to and towards its end remote from the gap formed by the recesses in the jaws so as to allow the tool to shear the web of the girder at a substantial angle to the length of such girder without the shearing portions fouling either of the girder flanges, and a stop for determining the extent to which the shearing portions can overlap.

In testimony whereof I have signed my name to this specification.

FREDERICK DONALD LINGWOOD.